US009587186B2

(12) United States Patent
Wakefield et al.

(10) Patent No.: US 9,587,186 B2
(45) Date of Patent: Mar. 7, 2017

(54) PRESSURIZED GASIFICATION APPARATUS TO CONVERT COAL OR OTHER CARBONACEOUS MATERIAL TO GAS WHILE PRODUCING A MINIMUM AMOUNT OF TAR

(75) Inventors: David W. Wakefield, Houston, TX (US); Robert G. Jackson, Houston, TX (US); Chen Lei, Taiyuan (CN)

(73) Assignee: EPIC CLEAN TECHNOLOGIES CORPORATION, Houston, TX (US)

( * ) Notice: Subject to any disclaimer, the term of this patent is extended or adjusted under 35 U.S.C. 154(b) by 508 days.

(21) Appl. No.: 12/465,310

(22) Filed: May 13, 2009

(65) Prior Publication Data
US 2010/0050515 A1    Mar. 4, 2010

Related U.S. Application Data

(60) Provisional application No. 61/191,012, filed on Sep. 4, 2008.

(51) Int. Cl.
*C01B 3/36*    (2006.01)
*C10J 3/30*    (2006.01)
(Continued)

(52) U.S. Cl.
CPC . *C10J 3/30* (2013.01); *C10J 3/42* (2013.01); *C10J 3/76* (2013.01); *C10J 3/78* (2013.01);
(Continued)

(58) Field of Classification Search
CPC .................. C10J 3/76; C10J 3/36; C10J 3/42
(Continued)

(56) References Cited

U.S. PATENT DOCUMENTS 3,454,382 A    7/1969 Hamilton
3,454,383 A    7/1969 Pirsch et al.
(Continued)

FOREIGN PATENT DOCUMENTS

DE    102007017402    10/2008
WO    03018720    3/2003
(Continued)

OTHER PUBLICATIONS

International Search Report and Written Opinion of PCT Application No. PCT/US2009/055973 dated Sep. 9, 2010: pp. 1-17.

*Primary Examiner* — Imran Akram
(74) *Attorney, Agent, or Firm* — Chamberlain Hrdlicka (57) ABSTRACT

An apparatus for the gasification of coal or other carbonaceous material is provided for operation at an elevated pressure of at least 30 psia, preferably, between 30 psia and 150 psia. Coal or other carbonaceous material passes downwards through two interconnected sections of a gasifier. In the upper section the coal is dried and partially devolatalized and so converted into a char before it passes into the lower section where it is converted, by reaction with steam and air, into ash and a gaseous mixture of carbon monoxide, hydrogen, carbon dioxide, methane, ethane, ethylene, hydrogen sulphide, carbonyl sulphide and small amounts of ammonia and phenols. The coal, ultimately converted to ash, exits the gasifier through a flanged semi-spherical containment section that has an integrated rotating grate, which collects and disposes of the ash and through which pass the air and steam used as reactants in the gasifier.

6 Claims, 8 Drawing Sheets

(51) Int. Cl.
*C10J 3/42* (2006.01)
*C10J 3/76* (2006.01)
*C10J 3/78* (2006.01)

(52) U.S. Cl.
CPC .... *C10J 2200/156* (2013.01); *C10J 2300/093* (2013.01); *C10J 2300/0956* (2013.01); *C10J 2300/0973* (2013.01); *Y02E 20/16* (2013.01); *Y02E 20/18* (2013.01)

(58) Field of Classification Search
USPC .......................... 48/61–118.5, 197 R–197 A
See application file for complete search history.

(56) References Cited

U.S. PATENT DOCUMENTS

| | | | | |
|---|---|---|---|---|
| 3,884,649 | A * | 5/1975 | Matthews | 48/202 |
| 3,994,702 | A * | 11/1976 | Schweimanns et al. | 48/197 R |
| 4,134,738 | A | 1/1979 | Bress et al. | |
| 4,165,970 | A | 8/1979 | Rudolph et al. | |
| 4,181,504 | A * | 1/1980 | Camacho | 48/197 R |
| 4,199,327 | A * | 4/1980 | Hempill et al. | 48/202 |
| 4,699,655 | A * | 10/1987 | Milionis | C21B 13/002 |
| | | | | 266/157 |
| 5,139,535 | A * | 8/1992 | Strickland et al. | 48/76 |
| 6,485,296 | B1 * | 11/2002 | Bender et al. | 432/58 |
| 6,830,597 | B1 * | 12/2004 | Green | 48/209 |
| 7,736,401 | B2 | 6/2010 | Ribesse | |
| 2001/0020346 | A1 * | 9/2001 | Schingnitz et al. | 48/127.9 |
| 2005/0108940 | A1 * | 5/2005 | Schingnitz et al. | 48/101 |
| 2007/0261616 | A1 * | 11/2007 | Engel | 110/101 R |
| 2008/0086945 | A1 * | 4/2008 | Wunning | 48/86 R |
| 2008/0134581 | A1 * | 6/2008 | Van Dyk et al. | 48/210 |
| 2008/0222956 | A1 * | 9/2008 | Tsangaris | C10J 3/005 |
| | | | | 48/77 |
| 2010/0018120 | A1 * | 1/2010 | Kangasoja | 48/62 R |

FOREIGN PATENT DOCUMENTS

| | | |
|---|---|---|
| WO | 2006053869 | 5/2006 |
| WO | WO 2006082543 A1 * | 8/2006 |
| WO | 2008039400 | 4/2008 |
| WO | WO 2008145814 A1 * | 12/2008 |

* cited by examiner

WELLMAN TWO-STAGE PRODUCER

Figure 8
Coal flow and compressor load relative to pressure

PRESSURIZED GASIFICATION APPARATUS TO CONVERT COAL OR OTHER CARBONACEOUS MATERIAL TO GAS WHILE PRODUCING A MINIMUM AMOUNT OF TAR

CROSS REFERENCE TO RELATED APPLICATIONS

This application claims priority to U.S. Provisional Application Ser. No. 61/191,012, filed on Sep. 4, 2008, which is incorporated herein in its entirety.

FEDERALLY SPONSORED RESEARCH

Not applicable.

REFERENCE TO MICROFICHE APPENDIX

Not applicable.

FIELD OF THE INVENTION

Embodiments of the current invention are generally related to the field of gasification of coal or other carbonaceous materials to gas.

BACKGROUND OF THE INVENTION

The first apparatus to commercially produce fuel gas from coal began to operate in the early 1800s. The equipment was simple, primarily consisting of a horizontal retort through which air or air and steam mixture was passed over a bed of incandescent coal. The products from the process were gas, tar and coke. About a hundred years later, the market no longer needed a large amount of coke. Consequently, vertical retorts were introduced to completely convert coal to ash.

These vertical retorts, now known as single stage gasifiers, received coal from the top and air and steam at the bottom. Five chemical and mechanical processes then took place in the gasifiers. First, there was the process of drying the coal. Second, the distillation of volatile matters occurred. Third, the gasification reaction took place. Fourth, the residual carbon in the coal was burned, and fifth, the residual ash was removed through a water sealed revolving grate.

The drying and distillation were driven by the heat contained in the gas as it rose through the descending coal. Control of the drying and especially the distillation was difficult, especially with coals with high volatile content. As a means to solve this problem, a two-stage gasifier design was created in the mid 1900s, in which the drying and de-volatilization processes were separated from the gasification process.

Figure 1:
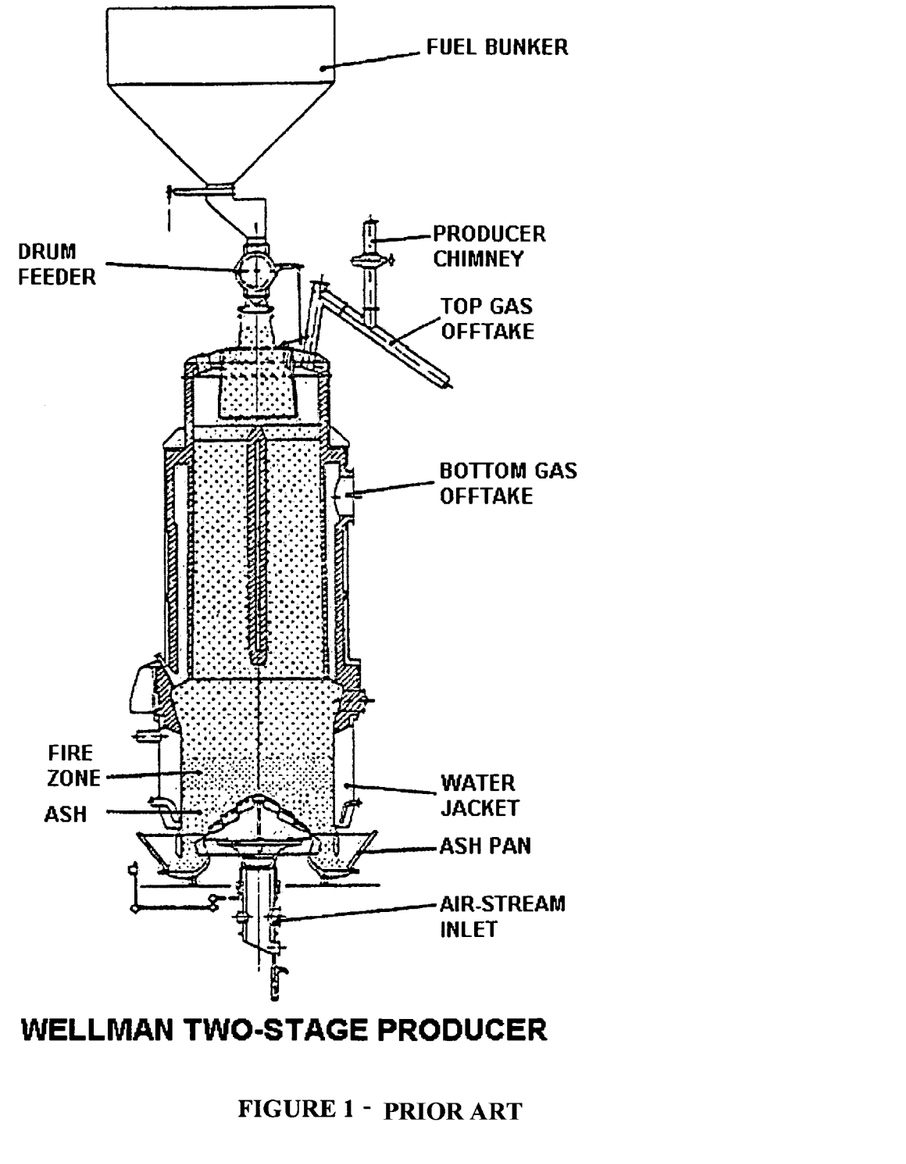
FIG. 1 is sketch of a prior art gasifier as shown in a leaflet circulated by Wellman Incandescent LTD in 1970.

This "two-stage" design fitted a second stage on top of a single stage gasifier so that the gasification could take place in the lower stage and drying and distillation in the upper stage. A refractory system including passageways was also fitted into the upper stage which allowed a portion of the gas produced in the lower stage to flow to an exit near the top of the upper stage. The remaining portion of the gas passed through the coal in the upper stage. The relative flows of the two portions were controlled by valves in the outlet pipes. An exemplary two-stage gasifier in the prior art is illustrated in FIG. 1 herein.

To prevent gas from leaking through the gasifier when discharging ash from the gasifier, water was used at bottom of the gasifier as a seal. The entire unit rotates slowly on a bearing surface located on a support structure below and there is no connection between the main body of the gasifier and the grate unit. Therefore, the gasifier in the prior art could only operate at atmospheric pressure or slight higher than atmospheric pressure. The output was low and the coal moved very slowly through the gasifier. As a result, a large number of gasifiers must be installed if the fuel gas was used to feed gas turbines, which generally required a delivery pressure of 250 to 450 psia. This is burdensome to operate and costly to maintain. Nevertheless, the "grate and water seal" design has been used for more than 50 years with very little changes, largely due to the difficulties in designing a vessel that can sustain the high pressure and the cost of constructing one.

The slow movement of the coal through the gasifier also made it difficult to know the exact condition of the process occurring in the gasifier. To solve this problem, U.S. Pat. No. 4,134,738 provided a system which used a rod to poke into the lower stage of the gasifier for a few minutes and then retrieve the rod for visual observation. This procedure was complicated and did not help to improve the output of the gasification process.

Another problem associated with the prior art gasifier was the tendency for the coal to swell and block the descending lanes of the reaction vessel due to the slow movement of the coal from the top to the bottom of the vessel and the rapid rate of heating applied to the coal. One solution was provided by U.S. Pat. No. 3,454,383 which used stirrers for the whole depth of the gasifier. However, this design eliminated many useful features of the original design as in the Wellman Incandescent Ltd Leaflet (FIG. 1 of the current application) and U.S. Pat. No. 4,134,738.

To solve one or more problems associated with the prior art gasifier, the current invention presents the following embodiments.

SUMMARY OF THE INVENTION

An apparatus for the gasification of coal or other carbonaceous material is provided for operation at an elevated pressure of at least 30 psia, preferably, between 30 psia and 150 psia. Coal or other carbonaceous material passes downwards through two interconnected sections of a gasifier. In the upper section the coal is dried and partially devolatalized and so converted into a char before it passes into the lower section where it is converted, by reaction with steam and air, into ash and a gaseous mixture of carbon monoxide, hydrogen, carbon dioxide, methane, ethane, ethylene, hydrogen sulphide, carbonyl sulphide and small amounts of ammonia and phenols. The coal, ultimately converted to ash, exits the gasifier through a flanged semi-spherical containment section that has an integrated rotating grate, which collects and disposes of the ash and through which pass the air and steam used as reactants in the gasifier.

According to one aspect of the current invention, there is provided an apparatus for gasifying a carbonaceous material comprising:
(a) a feeding system (100);
(b) an upper stage (200);
(c) a lower stage (300); and
(d) a grate system (400 and 500);
wherein the feeding system (100) receives the carbonaceous material and delivers it to the upper stage (200) of the apparatus, which in turn passes the carbonaceous material to the connected lower stage (300) for gasification;

wherein the grate system (400 and 500) is attached to the lower stage of the apparatus and forms a seal therewith so that the apparatus is capable of sustaining an internal pressure of at least about 30 psia.

According to one aspect of the current invention, there is provided a method of gasifying a carbonaceous material, such as coal, comprising:
(a) feeding the carbonaceous material to an upper stage (200) of a gasifier;
(c) passing the carbonaceous material to a lower stage (300) of the gasifier;
(d) collecting an ash of the carbonaceous material through a grate system (400 and 500) attached to the bottom of the lower stage (300) of the gasifier;
wherein the pressure inside the upper stage (200) and the lower stage (300) of the gasifier is maintained at a minimum of about 30 psia.

DESCRIPTION OF THE PREFERRED EMBODIMENTS

The following description illustrates embodiments of the invention by way of example and not by way of limitation. Thus, the embodiments described below represent preferred embodiments of the invention, but not the only embodiments that can be carried out under the principle of the current invention. All numbers disclosed herein are approximate values unless stated otherwise, regard less whether the word "about" or "approximately" is used in connection therewith. The numbers may vary by 1%, 2%, 5% or sometimes 10 to 20%. Whenever a numeral range with a lower limit and a supper limit is disclosed, any number falling with the range is specifically and expressly disclosed.

Although coal and coal gasification have been described expressly in the following description, it should be understood that other carbonaceous materials, such as petroleum, biofuel or biomass, and be used in replacement of coal without departing from the teaching of the current application. In some embodiments, there is no amendment to the structure of the apparatus and method of the current invention. In some other embodiments, the structure or method of the current invention is amended to adapt to the particular features of the carbonaceous material. All such variations should be considered within the scope of the current invention.

As used herein, the term "pressure" vessel means a gasifier that is designed and constructed to operate at less than 30 psia internal pressure; the term "low pressure" vessel means a gasifier that is designed and constructed to operate at between 30 psia to 150 psia internal pressure; the term "high pressure" vessel means a gasifier that is designed and constructed to operate at above 150 psia internal pressure.

According to one embodiment of the current invention, there is provided a two-stage gasifier that is capable of sustaining at least 30 psia internal pressure during operation. According to another embodiment, the two-stage gasifier is capable of sustaining at least 50 psia, or even about 150 psia, internal pressure during operation. According to yet another embodiment, there is provided a two-stage gasifier that is capable of sustaining from about 30 psia to about 150 psia internal pressure during operation. According to further embodiment, there is provided a two-stage gasifier that is capable of sustaining from about 50 psia to about 150 psia internal pressure during operation.

Figure 2:
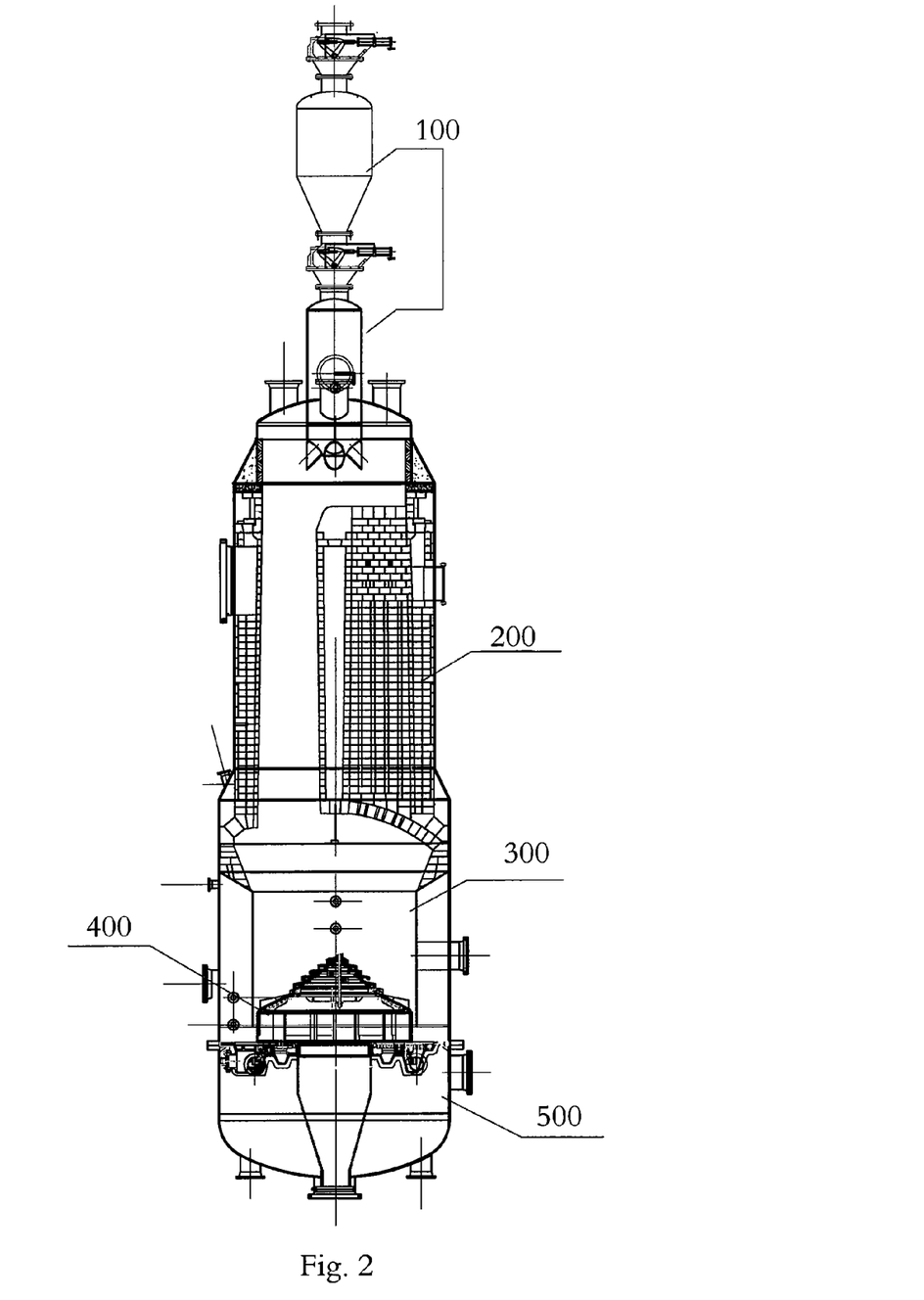
FIG. 2 illustrates a gasifier according to one embodiment of the invention.

According to one embodiment of the current invention, as shown in FIG. 2 herein, there is provided a two-stage gasifier comprising a coal feeding system (100), an upper stage for drying and distillation the coal (200), a lower stage for gasifying the coal (300), a grate for passing through air and steam (400), and a grate support from which ash exits the gasifier and the operating system (500).

According to one preferred embodiment, the grate and the grate support are attached to the lower stage of the gasifier to provide a sufficiently seal with the lower stage of the gasifier. According to another preferred embodiment, the grate and the grate support possess sufficient strength to carry the load of the coal, char and ash column that fills the gasifier.

Figure 3:
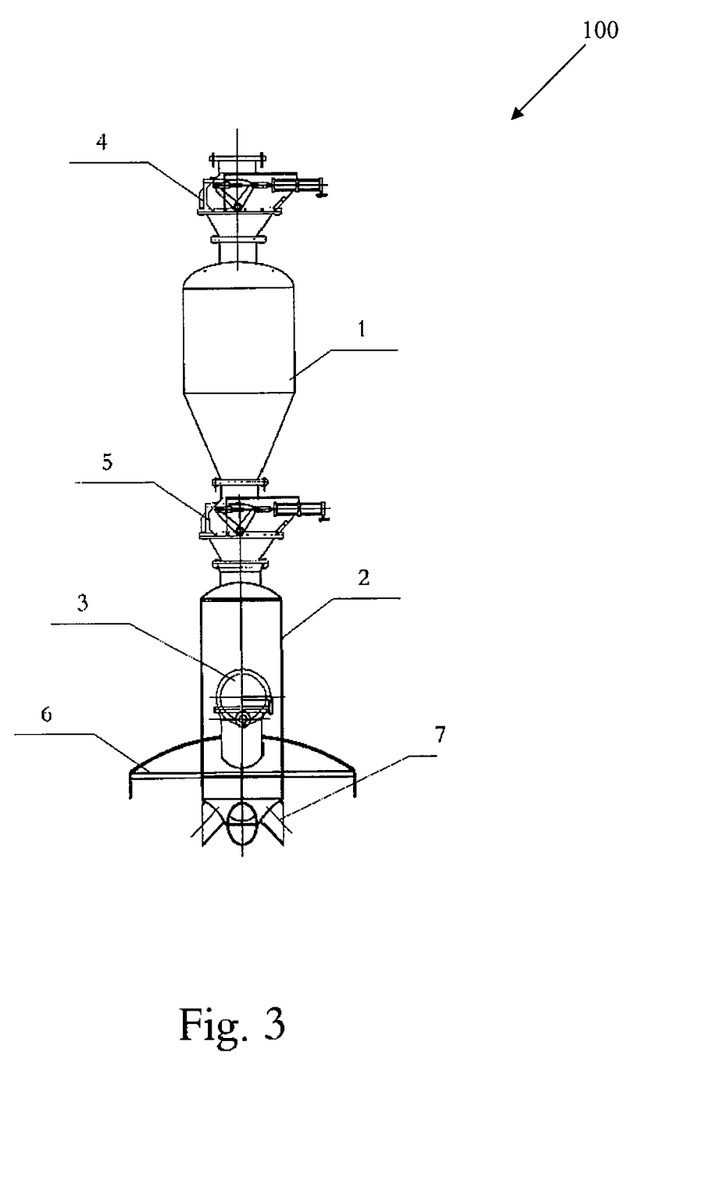
FIG. 3 shows the lock hopper of the gasifier according to one embodiment of the invention.

FIG. 3 shows the detailed structure of the coal feeding system (100) according to one embodiment of the current invention, where coal can be fed from a day bin into a lock hopper (1) from which it descends into a holding vessel (2). Since the gasifier is within a pressure vessel, the coal feed system must accept coal at atmospheric pressure yet deliver it into the gasifier at the operating pressure. To this end, according to one embodiment of the current invention, a seal valve (4) is provided at the entry of the lock hopper (1) and another seal valve (5) is provided at the exit of the lock hopper. Coal will enter the lock hopper (1) from a day bin when the entry valve (4) opens and exit the lock hopper (1) when the exit valve (5) opens.

To maintain the internal pressure of the gasifier, both valves should not be opened at the same time, therefore preventing the internal space of the gasifier from being connected to the outside atmosphere during the coal feeding process. Moreover, after the lock hopper (1) is filled with coal and the entry valve (4) is closed, according to a preferred embodiment of the current invention, an inert gas (such as steam, carbon dioxide or nitrogen) can be introduced into the lock hopper (1) to pressurize it to a level that is either around the gasifier pressure or, more preferably, slightly higher than gasifier pressure. Therefore, when the exit valve (5) is opened, the coal can be delivered into the holding vessel (2) with little disturbance to the internal pressure of the gasifier.

In certain embodiments, the holding vessel (2) contains a level gauge (3) to measure and indicate the coal level inside the holding vessel (2). In certain other embodiments, the holding vessel (2) has a volume that is greater than that of the lock hopper (1), preferably at least 25% greater than that of the lock hopper (1). Therefore, when the level gauge indicates that the coal level has fallen by a certain amount, the lower valve (5) will open and allow the coal to pass into the holding vessel (2). When the level gauge shows that the coal is completely discharged from the lock hopper (1), the lower valve (5) will close and the pressure will be released from the lock hopper (1) to prepare for the next cycle.

In some embodiments, the coal can then be passed through a semi-spherical cap (6) of the gasifier, via an entry nozzle (7), and distributed into lanes in the upper stage of the gasifier. In a preferred embodiment, the entry nozzle is slanted at an angle, so that the coal can be distributed to a height sufficient to maintain a continuous coal stream within the gasifier. The gas rising through the coal will exit through two outlets (8) in the vessel cap (6).

Figure 4:
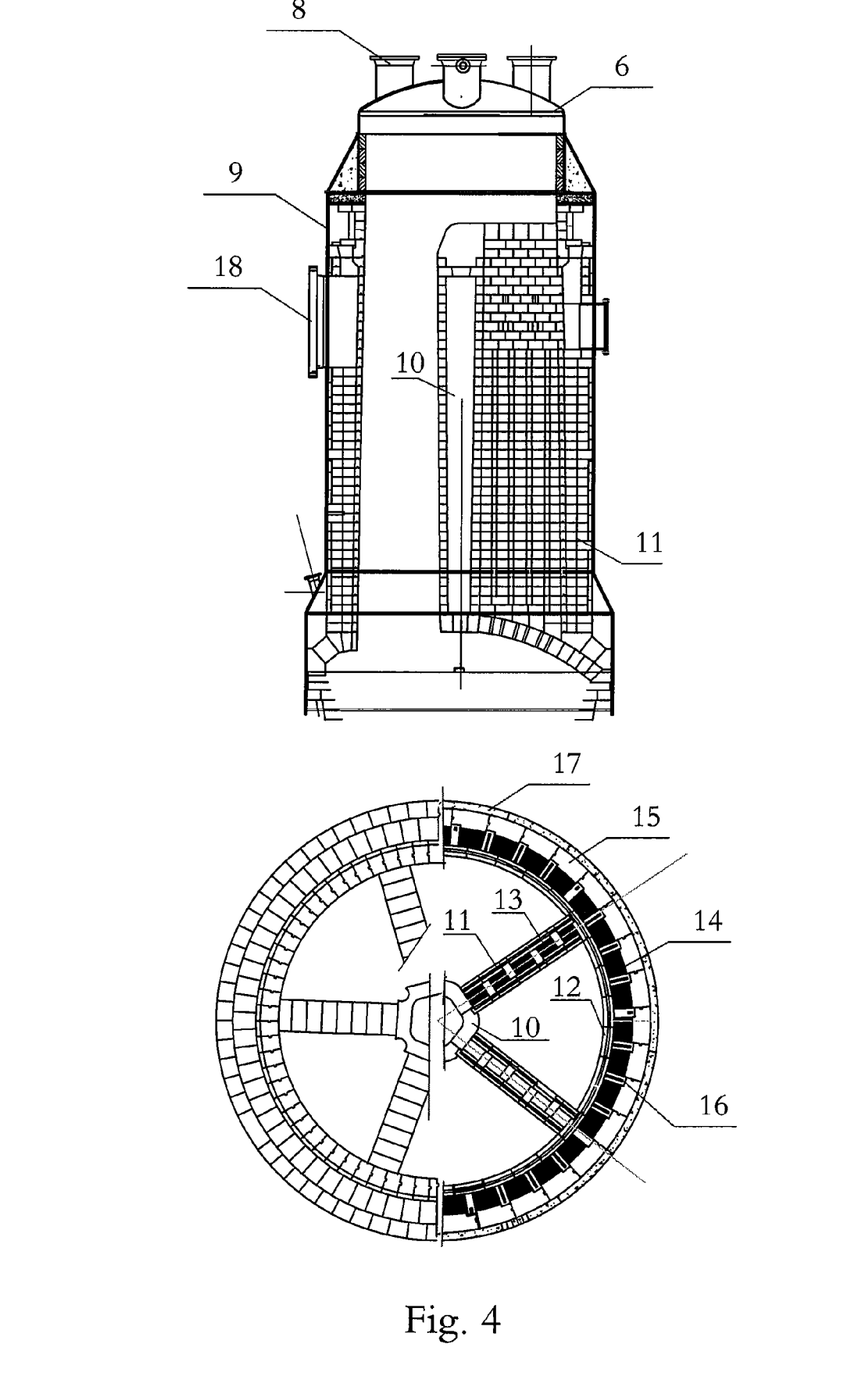
FIG. 4 shows the upper stage of the gasifier according to one embodiment of the invention.

In FIG. 4, the coal from the holding vessel (2) is passed into a number of lanes in the upper stage of the gasifier (200), according to a preferred embodiment of the current invention, where the coal is dried and a portion of the volatile component in the coal is driven off. The upper stage of the gasifier (200) may comprise an upper shell of the pressure vessel (9), which may contain a carefully designed refractory bricks or cast structure acting as a heat exchanger to transfer heat from the rising gas to the coal as the coal descends through the gasifier. The coal is first dried and then partially carbonized before it descends into the lower stage (300) as char. For a gasifier of more than 11 feet internal diameter, as shown in the drawing, five lanes are preferred. For gasifiers with an internal diameter of less than 11 feet, four lanes can be used.

The refractory bricks or cast structure, as shown in the drawing, is illustrated for a 11 feet inside diameter vessel and can be divided into the following parts for the convenience of describing their structures and functions. The first part of the refractory structure is a hollow pillar (10), which acts as the "keystone" to hold the walls (11) that divide the internal space into 5 lanes. The lower ends of each of these walls can take the form of an arch to provide better supports to the weight of the wall above, although other designs can be employed as well. Each wall may contain passageways (12), through which a portion of the gas formed in the lower stage of the gasifier (300) can pass upwards into a collection zone near the top of the structure. The walls, at their outer ends, can join a refractory inner cylinder (13), which is surrounded by an outer cylinder (15). The two cylinders can be connected by a number of spacers (16) that form vertical passageways between them (14), through which another portion of the gas can pass upwards into the collection zone.

In some embodiments, the thickness of the inner cylindrical wall allows a certain amount of heat to pass from the vertical passageways into the lanes so as to heat the descending coal in the boundary layers in the lanes. The areas of the passageways in the walls and the surrounding vertical passageways can be carefully selected so that a predetermined amount of gas formed in the lower stage of the gasifier (300) can be passed into the collection zone via the passageways. In one preferred embodiment, the predetermine number is no less than 60% and no more than 75% of the gas formed in the lower stage of the gasifier (300).

The outer cylinder wall (15) can also function to insulate the outer wall of the pressure vessel and maintain the vessel surface temperature at a safe level. The upper part of the refractory structure may contain a horizontal gas collection zone from which the gas is directed to flow to a penetration in the wall (18) from which the gas can be passed to the next stage of the process. At the top of the refractory structure and above the gas collection zone, all the passageways can be sealed.

The refractory structure can be built of refractory bricks or of refractory material cast in place. The drawing presented in FIG. 4 is illustrated on the basis of a refractory structure using precast bricks. In this case, the space between the outer cylinder and the vessel steel (17) can be filled with a mortar consisting of ground refractory and Portland cement. Preferably, the refractory is based on the use of high magnesite content clay. After assembly the whole structure can be cured by slowly raising the temperature to operating temperature before the gasifier is put into operation.

Figure 5:
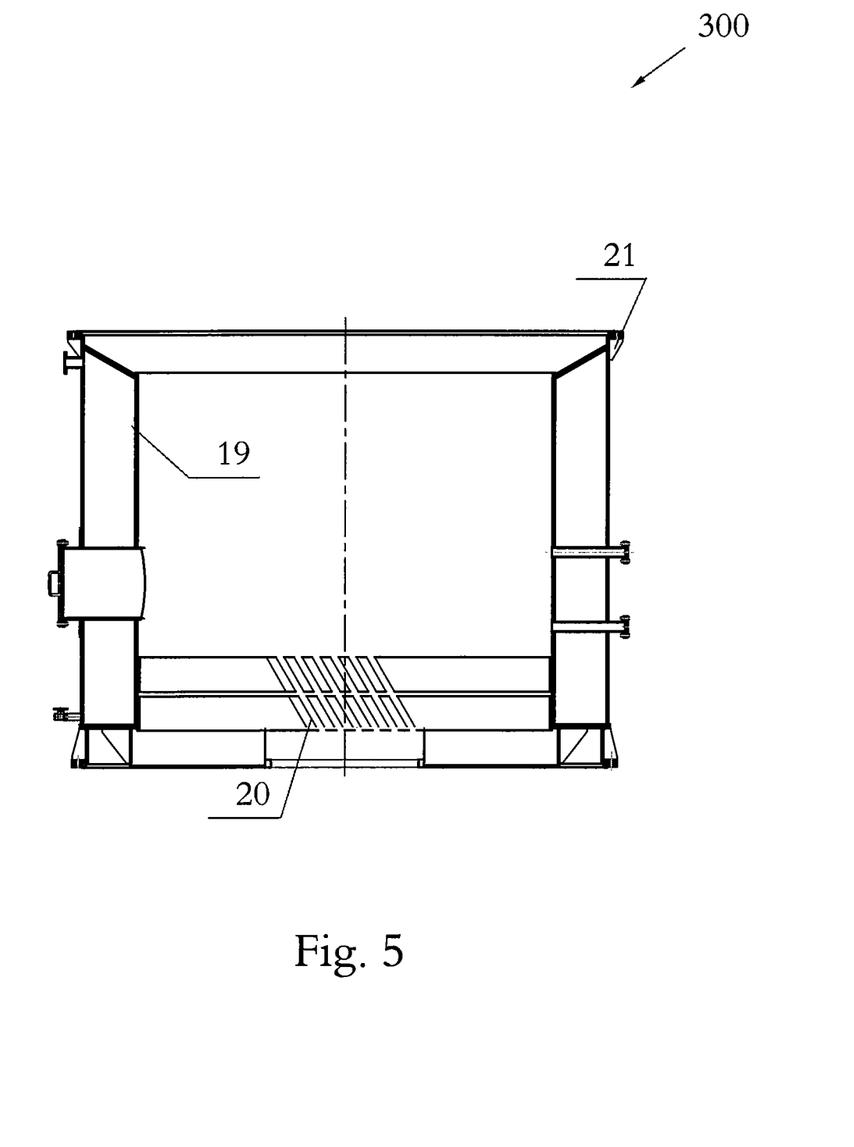
FIG. 5 shows the lower stage of the gasifier according to one embodiment of the invention.

FIG. 5 shows the lower stage of the gasifier (300) according to one embodiment of the current invention. In this section of the gasifier, the outer temperature of the gasifier wall is controlled by surrounding the steel shell with a water jacket (19). In a preferred embodiment, multiple bars (20) of strong metal (such as steel) are welded onto the inner surface of the shell at the level of the spreader of the grate (400). In the event that large pieces of clinker are formed above the grate, they can be broken into small pieces as they pass between the edge of the grate and the multiple bars (20).

Figure 6:
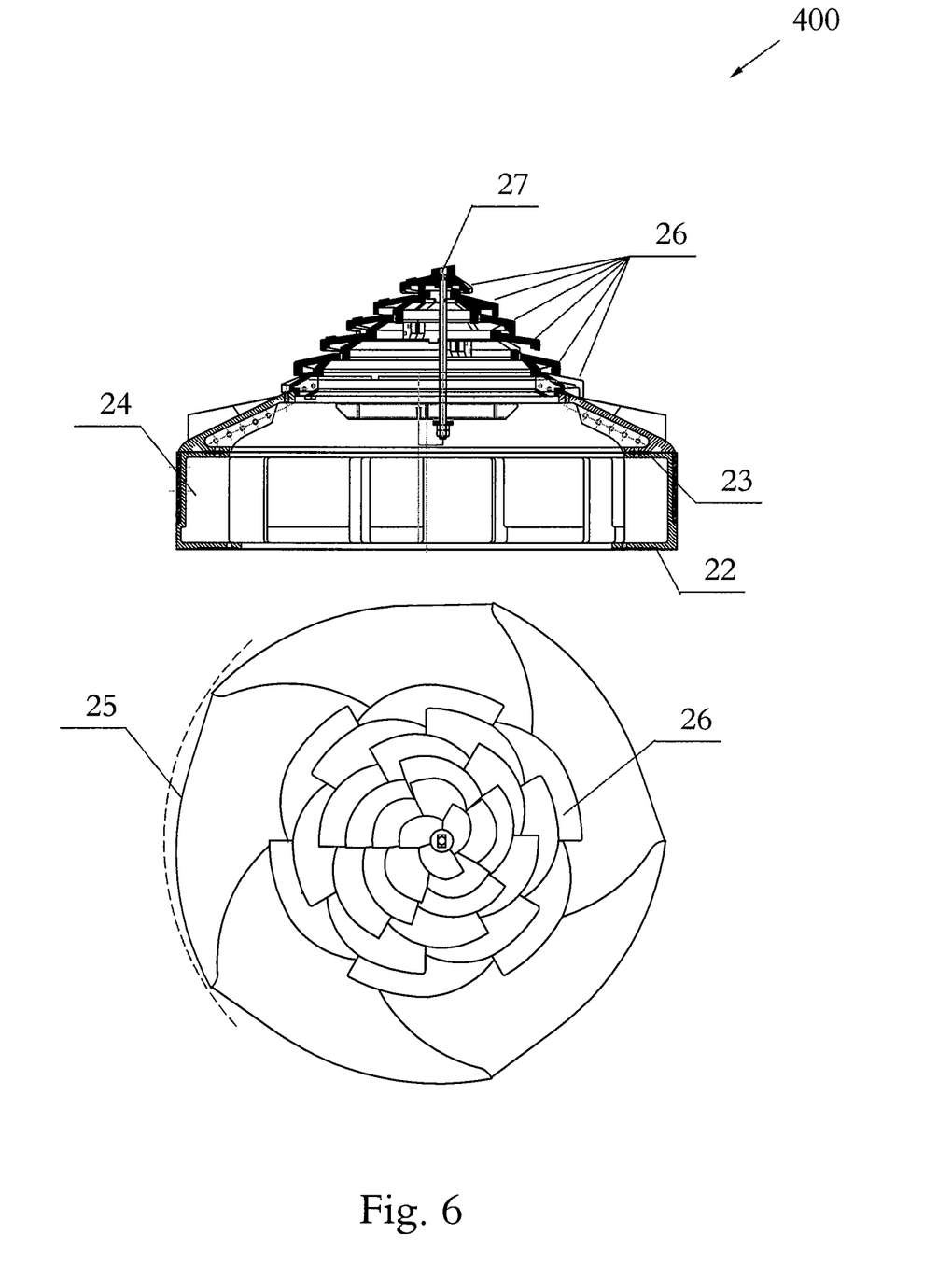
FIG. 6 shows the grate of the gasifier according to one embodiment of the invention.

FIG. 6 shows a preferred embodiment of the grate (400) according to certain embodiments of the current invention. The grate (400), which collects the ash and supports the whole weight of the coal, can also pass air and steam into the lower stage of the gasifier (300) as it rotates slowly in a clockwise or counter-clockwise direction. The design illustrated in FIG. 6 is for a gasifier of 11 feet or greater than 11 feet internal diameter. Other designs can be also be used. In one embodiment, the bottom of the grate is a cast steel cylinder with upper and lower circumferential flanges. The lower flange (22) can be used to bolt the grate to the grate support (500) and the upper flange (23) can be used to connect the ash spreader system and the plates through which air and steam enter the lower stage of the gasifier.

The ash spreader system may consist of a base spreader plate (24) that moves the ash towards its edge so that it can fall between the outside shell of the bottom casting and the inner wall of the water jacket. In one embodiment, the spreader is made of 5 circular segments (25) of greater diameter than the bottom so that at the center of the segment the gap between the spreader and the water jacket is at its maximum and at the junction of the segments the clearance is at its minimum. In this way pieces of clinker can fall into the gap and can be broken into smaller pieces as the protruding corner traps them between the corner and the steel bars (20) welded to the inside of the water jacket.

According to certain embodiments, above the spreader are 6 cast steel plates of spiral form (26) that simultaneously push the ash layer lying on them towards the circumference and allow air and steam to pass between them. The air and steam increase their temperature as they pass through the plates and the ash, and at the same time prevents the plates from overheating. The plates can be held together by a long bolt (27). In order to further facilitate the motion of the ash, the center line of the plates can be offset from the center line of the bottom. If the gasifier is less than 11 feet in diameter, the spreader may consist of 4 segments and only 5 plates can be used. Variations in the segment number and plate number can be used without departing from the teaching of the current invention.

Figure 7:
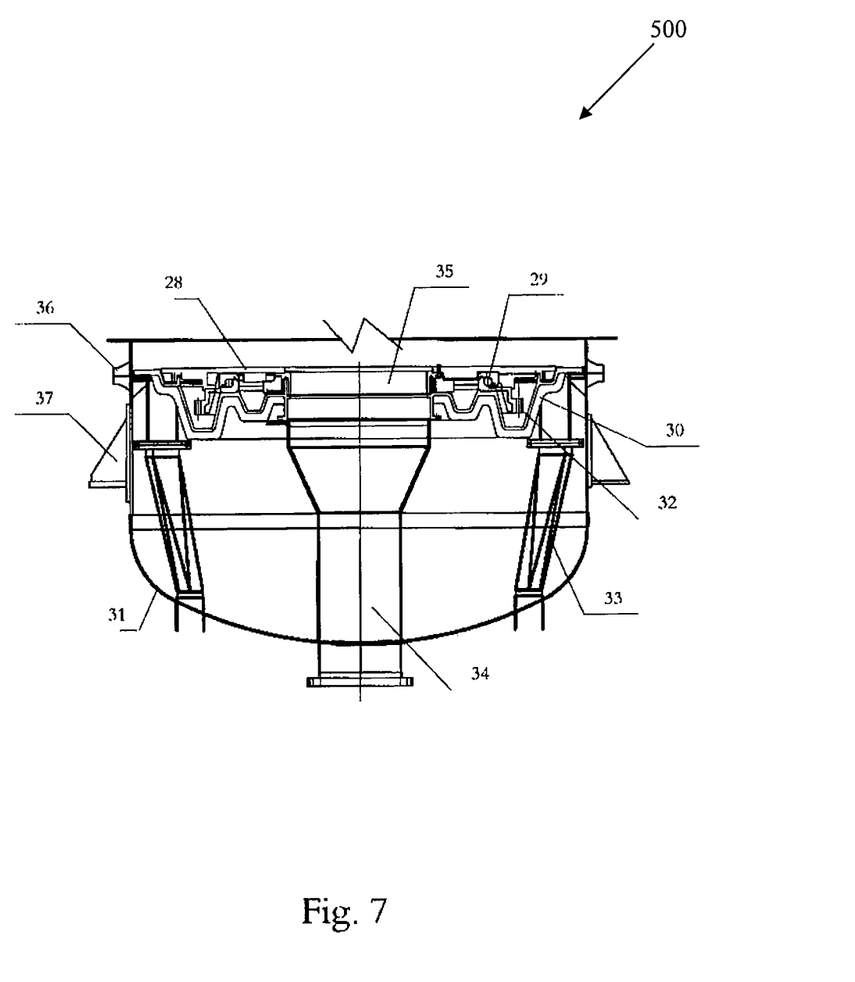
FIG. 7 shows the grate support of the gasifier according to one embodiment of the invention.

FIG. 7 shows the structure of a grate support (500) in accordance to a preferred embodiment of the current invention. The upper part of the grate support (500) is a support plate (28), which can be bolted to the grate and rotates on roller bearings (29) fitted to the middle part (30) of the grate support (500). The middle part forms the actual bottom of the gasifier and is attached to the third part, which is the outer shell of the pressure vessel bottom seal (31). A circular set of teeth (32) can be provided into the lower side of the support plate and preferably are moved by a hydraulic ram to turn the grate slowly to move the ash to the ash exits (33). The air and steam delivery pipe (34) can be slid into an opening (35) situated in the center of the support plate and the bottom casting. The entire bottom section can be assembled and tested before fitting to the bottom flange (36) of the lower stage of the gasifier (300). Supports (37) can be welded to the outside of the bottom shell to hold it during assembly, to raise it into place to be fitted and to lower at times of inspection and maintenance.

The two-stage gasifier of the current application can be used either at low temperature (e.g. between about 2,000° F. to 2,200° F.) so the ash remains as dry solids, or at high temperature (e.g. at or above 3,000° F.) where the ash is melted into the liquid form and is removed from the gasifier as a liquid. Gasification reactions typically do not begin until the temperature in the reaction zone reaches 1200° F. (650° C.) for lignite and higher for less reactive coals and reach a maximum at about 2,200° F. if the ash is disposed of as a solid, and about 3,000° F. if the ash is disposed of as a liquid slag.

The conversion of the coal in the two-stage gasifier from coal to ash is a semi-automatic process in which the bed of solid coal slowly converts to gas thus allowing more coal to enter. The time for the entire process, including drying, de-volatilization, gasification and finally burning to ash, may vary according to the composition of the coal, the reactivity of the char produced in the upper stage of the gasifier, the amount of oxygen added to the reaction zone, and the temperature and the pressure in the gasifier, etc.

For example, low rank coals such as North Dakota, Montana and Gulf Coast Lignite and Montana and Wyoming Sub-bituminous Coals (PRB) are very reactive and gasify quickly, whereas high rank coals such as Illinois Basin and Pennsylvania-seam Bituminous Coals are not very reactive and so take longer. As a result, low rank coals are better suited for the two-stage gasifier of the current invention, although almost all coals and carbonaceous materials can be used in the current invention.

According to some embodiments of the current invention, the chars produced from low rank coals need about 30 minutes to completely gasify. As the bed is continuous from the receiving vessel to the level of the grate, the volume of char gasified in that 30 minutes will be replaced by an equal volume of coal entering the top of the gasifier. This quantity, therefore, will be the maximum quantity of coal that can be gasified irrespective of the operating pressure of the gasifier.

Oxygen level is another factor that can affect the output of a two stage gasifier. An increased level of oxygen can be achieved by add an air separation plant and using near pure oxygen in the gasifier. However, one disadvantage of this approach is the high operation cost and parasitic load imposed on the overall plant. The current invention can operate on oxygen or air. When operating on air, more oxygen can be effectively added with the increased level of pressure, therefore reducing the expense and parasitic load.

The gasifier of the current invention may operate in multiple units (preferably, 8 units, more preferably, 12 units). The optimum operating pressure may range from about 30 psia to 150 psia, more preferably from about 50 psia to 150 psia.

At least one utility of the current invention is to provide fuel gas to a power plant which may comprise a gas turbine, a heat recovery steam generator and a steam turbine and an electricity generator. Such a combination can have a thermal efficiency from coal to electric power as high as 46% and can permit the capture of more than half of the carbon in the coal as carbon dioxide without the efficiency falling below 40%.

The traditional atmospheric two-stage gasifier does not fit well into this purpose, because far too many units of the gasifier would be needed to supply the fuel gas to an industrial gas turbine. The pressured gasifier of the current invention is a much better candidate. With a small number of units operating at an elevated pressure, for example, between about 30 psia and 150 psia, high thermal efficiencies can be achieved at an acceptable cost.

The following examples are provided to further illustrate the invention. They represent specific embodiments of the current invention and should not be interpreted or construed as limitations to the scope of the invention.

EXAMPLES

Gasifiers with a structure as sown in FIG. 2 above and a 11 feet nominal diameter were used to process coals such as lignite and PRB. The volume of the lower stage of the gasifier above the grate was approximately 1,450 cubic feet, of which about 800 cubic feet was in the gasification zone. The gasifier used lump coal in a size range from 2 inches to ¼ inch, which was generally considered to have a density of about 40 pounds per cubic foot. The estimated maximum quantity of lignite that could be gasified was 64,000 lb/hour and the estimated maximum quantity of PRB coal was 58,000 lb/hour. Calculations showed that the above quantity of lignite would be gasified if the gasifier were to be operating at 120 psia and that the above quantity of PRB coal would be gasified if the gasifier were to be operating at 155 psia.

In each case, 12 gasifiers were used to provide the fuel gas to two Frame 7FB industrial gas turbine (as manufactured by the General Electric Company). Each gas turbine exhausted into a heat recovery steam generator (HRSG) that supplied high pressure steam to a steam turbine. In the case where $CO_2$ was captured as shown in column 3, additional fuel could be burned in the inlet duct of the HRSG to provide the additional steam needed for the process and the power needed to separate and compress the $CO_2$ for sequestration. In that case, the operating pressure of the gasifier should preferably be increased to 100 psia, to provide the additional fuel gas to the HRSG. Column 4 shows that for PRB coal. Because of the different composition, the gasifiers operated at 93.5 psia.

One advantage of operating at high pressure is that it allows the output of the gasifiers to be varied to meet any required demand. For example, as shown in the Table below, the IGCC power plants of about 550 megawatts used two different coals and for one plant in which 52% of the carbon dioxide formed in the combustion process is captured for late sequestration.

|  | Coal | | |
| --- | --- | --- | --- |
|  | Lignite | Lignite with $CO_2$ capture | PRB |
| Gasifier Pressure psia | 82 | 100 | 93.5 |
| Airflow to gasifiers pph | 639,592 | 757,450 | 776,180 |
| Coal Used at Full Load Tons/hr | 286.76 | 333.79 | 235.02 |
| Fuel Gas to Gas Turbine | 3525.14 | 3,433.68 | 3515.90 |

-continued

|  | Coal | | |
|---|---|---|---|
|  | Lignite | Lignite with $CO_2$ capture | PRB |
| mmbtu/hr |  |  |  |
| Fuel Gas to HRSG mmbtu/hr | 0.00 | 475.70 | 0.00 |
| HP Steam to Steam Turbine pph | 972,982 | 1,491,804 | 967,010 |
| HP Steam to Process pph | 0.00 | 353,636 | 0.00 |
| Gas Turbine Power kW | 408,086 | 395,944 | 408,446 |
| Steam Turbine Power kW | 217,305 | 251,006 | 215,971 |
| Gasifier Aux. Load kW | 62,113 | 84,058 | 61,989 |
| Plant Auxiliary Load kW | 14,560 | 14,560 | 14,605 |
| Total Net Saleable Power kW | 548,718 | 548,332 | 547,824 |
| Heat Rate Btu/kwh (efficiency %) | 7,402 (46.11) | 8,637 (39.52) | 7,682 (44.43) |
| CO2 in Flue Gas lb/MW-hr | 1,467 | 839 | 1,580 |

Figure 8:
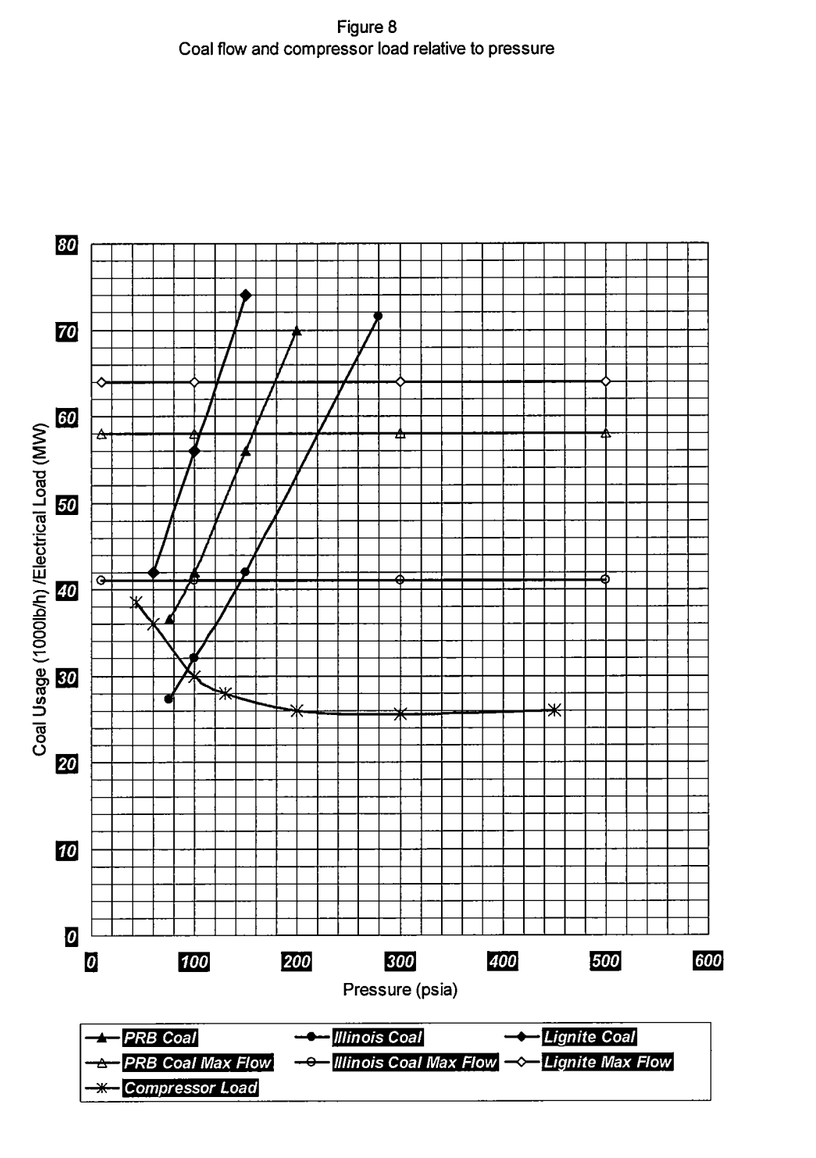
FIG. 8 shows the effect of gasifier operating pressure on the quantity of coal that can be gasified and the power needed to compress the air and the fuel gas.

FIG. 8 showed the relationship of the pressure, the gas product and the power consumption. As shown in the figure, the amount of the coal that could be gasified reaches its limit due to the activity of the coal, and there was limited benefit in total compression power reduction when the pressure was above about 150 Psia. Therefore, it was not likely to further increase the output of the gasifier by operating at a pressure higher than about 150 psia. Meanwhile, constructing and operating a vessel for use at above about 150 psia would be much higher, which was a major disadvantage against the use of a vessel at such a high pressure.

FIG. 8 also showed the share of the gasifier auxiliary load due to the power required to compress the air needed by the gasifiers plus the power required to compress the fuel gas to the pressure needed at the entry to the gas turbine combustor. As shown in the figure, the total compression load was reduced only slightly by operating the gasifier at a pressure higher than about 150 psia.

While the invention has been described with a limited number of embodiments, these specific embodiments are not intended to limit the scope of the invention as otherwise described and claimed herein. Variations and modifications therefrom exist. The appended claims intend to cover all such variations and modifications as falling within the scope of the invention.

We claim:

1. A method for gasifying a carbonaceous material, comprising
    feeding the carbonaceous material to an upper vessel of a gasifier;
    drying and devolatilizing the carbonaceous material in the upper vessel;
    reacting the dried and devolatilized carbonaceous material with steam and air in a lower vessel surrounded by a water jacket to produce ash and gas;
    collecting the ash of the carbonaceous material through a grate system in sealing engagement with the bottom of the lower vessel;
    maintaining the pressure inside the upper vessel and the lower vessel between 75 psia and about 150 psia; and
    passing between about 60% and about 75% of the gas produced in the lower vessel through a refractory structure in the upper vessel.

2. The method of claim 1, wherein the grate system comprises:
    a grate; and
    a grate support attached to the lower vessel for supporting the grate.

3. The method of claim 2, wherein the grate support comprises a support plate configured to rotate on the grate support via roller bearings located on the grate support.

4. The method of claim 1, wherein the carbonaceous material is coal.

5. The method of claim 4, wherein the coal is at least one of low rank coal, lignite, and Powder River Basin (PRB) coal.

6. The method of claim 1, further comprising feeding at least a portion of the gas to an industrial gas turbine at a pressure between about 75 psia and about 150 psia to produce electric power.

* * * * *